United States Patent
Bishop, Jr. et al.

[11] Patent Number: 5,928,020
[45] Date of Patent: Jul. 27, 1999

[54] POWER CONNECTOR SYSTEM FOR A RIDE-ON VEHICLE

[75] Inventors: Julian J. Bishop, Jr., Belmont, Mass.; Chuck J. Crofut; Jeffrey W. Reynolds, both of East Aurora, N.Y.

[73] Assignees: Mattel, Inc., El Segundo, Calif.; Ark-Les Corp., Stoughton, Mass.

[21] Appl. No.: 09/013,846

[22] Filed: Jan. 27, 1998

[51] Int. Cl.$^6$ .......................... H01R 13/703; H01M 2/02
[52] U.S. Cl. .......................... 439/188; 320/112; 429/97; 429/123; 439/218; 200/51.09
[58] Field of Search .................. 429/96, 97, 121, 429/123; 439/188, 218; 200/51.09; 320/111, 112, 114

[56] References Cited

U.S. PATENT DOCUMENTS

| | | |
|---|---|---|
| 3,066,643 | 12/1962 | Flanagan, Jr. . |
| 3,186,878 | 6/1965 | Filander . |
| 3,194,688 | 7/1965 | Riley, Jr. et al. . |
| 3,462,726 | 8/1969 | Stark et al. . |
| 3,533,119 | 10/1970 | Dokos . |
| 3,562,698 | 2/1971 | Merry . |
| 3,728,787 | 4/1973 | McDonough . |
| 3,980,370 | 9/1976 | Gonzalez-Hernandez . |
| 3,980,385 | 9/1976 | Hirokawa et al. . |
| 3,982,084 | 9/1976 | Cooperstein . |
| 3,998,518 | 12/1976 | Mathe . |
| 4,072,800 | 2/1978 | Gammer . |
| 4,084,123 | 4/1978 | Lineback et al. . |
| 4,191,917 | 3/1980 | Brown et al. . |
| 4,216,839 | 8/1980 | Gould et al. . |
| 4,389,551 | 6/1983 | Deibele et al. . |
| 4,393,283 | 7/1983 | Masuda . |
| 4,426,558 | 1/1984 | Tanaka et al. . |
| 4,436,792 | 3/1984 | Tomino et al. . |
| 4,447,749 | 5/1984 | Reeb, Jr. et al. . |
| 4,450,400 | 5/1984 | Gwyn . |
| 4,481,458 | 11/1984 | Lane . |
| 4,528,429 | 7/1985 | Dobson et al. . |
| 4,550,972 | 11/1985 | Romak . |
| 4,555,849 | 12/1985 | Ando et al. . |
| 4,575,704 | 3/1986 | Pezold . |
| 4,578,628 | 3/1986 | Siwiak . |
| 4,671,524 | 6/1987 | Haubenwallner . |
| 4,726,775 | 2/1988 | Owen . |
| 4,728,876 | 3/1988 | Mongeon et al. . |
| 4,751,452 | 6/1988 | Kilmer et al. . |
| 4,756,978 | 7/1988 | Nitcher et al. . |
| 4,772,215 | 9/1988 | Falk . |
| 4,835,410 | 5/1989 | Bhagwat et al. . |
| 4,847,513 | 7/1989 | Katz et al. . |
| 4,871,629 | 10/1989 | Bunyea . |
| 4,923,416 | 5/1990 | Zinn . |

(List continued on next page.)

*Primary Examiner*—Neil Abrams
*Attorney, Agent, or Firm*—Kolisch, Hartwell, Dickinson, McCormack & Heuser

[57] ABSTRACT

A battery connector system for use with a powered ride-on vehicle for children, where the vehicle includes an electric motor adapted to drive one or more wheels of the vehicle and a wiring harness adapted to convey power to the motor. The battery connector system includes a plug attached to the wiring harness and has a case substantially enclosing positive and negative plug contacts. The plug further includes a normally-open switch interposed between a switched one of the plug contacts and the wiring harness with the switch having an actuator by which the switch may be closed, whereby the switched plug contact is not electrically connected to the wiring harness until the switch is closed. The system further includes a battery including positive and negative terminals and a socket including housing structure adapted to fit together with the plug case and substantially enclosing positive and negative socket contacts which are respectively connected to positive and negative terminals of the battery. The housing structure is adapted to position the positive and negative socket contacts to respectively engage the positive and negative contacts on the plug when the housing structure and case are fit together. The battery connector also includes a key adapted to engage the actuator and close the switch when the housing structure and case are fit together. A portion of the socket may serve as a charging jack for the battery.

23 Claims, 7 Drawing Sheets

U.S. PATENT DOCUMENTS

| | | |
|---|---|---|
| 4,927,787 | 5/1990 | Patel . |
| 4,957,829 | 9/1990 | Holl . |
| 4,995,017 | 2/1991 | Sellati et al. . |
| 5,023,417 | 6/1991 | Magiera . |
| 5,036,938 | 8/1991 | Blount et al. . |
| 5,065,082 | 11/1991 | Fushiya . |
| 5,075,518 | 12/1991 | Matsumoto . |
| 5,095,182 | 3/1992 | Thompson . |
| 5,145,391 | 9/1992 | Alwine . |
| 5,145,422 | 9/1992 | Fry . |
| 5,146,149 | 9/1992 | Nilssen . |
| 5,180,310 | 1/1993 | Miller . |
| 5,186,639 | 2/1993 | Comerci et al. . |
| 5,188,545 | 2/1993 | Hass et al. . |
| 5,208,525 | 5/1993 | Lopic et al. . |
| 5,213,913 | 5/1993 | Anthony, III et al. . |
| 5,217,824 | 6/1993 | Womack . |
| 5,224,870 | 7/1993 | Weaver et al. . |
| 5,224,885 | 7/1993 | Younfleish . |
| 5,229,703 | 7/1993 | Harris . |
| 5,234,066 | 8/1993 | Ahsing et al. . |
| 5,237,742 | 8/1993 | McClune . |
| 5,260,636 | 11/1993 | Leiserson et al. . |
| 5,298,821 | 3/1994 | Michel . |
| 5,360,307 | 11/1994 | Schemm et al. . |
| 5,362,260 | 11/1994 | Peloza . |
| 5,368,954 | 11/1994 | Bruns . |
| 5,374,199 | 12/1994 | Chung . |
| 5,378,552 | 1/1995 | Dixon, Jr. . |
| 5,378,553 | 1/1995 | Shoji . |
| 5,378,555 | 1/1995 | Waters et al. . |
| 5,401,591 | 3/1995 | Bishay et al. . |
| 5,401,592 | 3/1995 | Gilpin et al. . |
| 5,411,534 | 5/1995 | Dieken et al. . |
| 5,422,198 | 6/1995 | Lin ........................................ 429/121 |
| 5,434,494 | 7/1995 | Perego . |
| 5,435,748 | 7/1995 | Abe . |
| 5,462,445 | 10/1995 | Anhalt . |
| 5,477,936 | 12/1995 | Sugioka et al. . |
| 5,487,686 | 1/1996 | Sawada . |
| 5,513,999 | 5/1996 | Fry et al. . |

POWER CONNECTOR SYSTEM FOR A RIDE-ON VEHICLE

FIELD OF THE INVENTION

The present invention relates to powered ride-on vehicles for children and more particularly to a power connector system for use in such a vehicle.

BACKGROUND OF THE INVENTION

Powered ride-on vehicles for children typically use a rechargeable six- or twelve-volt battery to supply power to at least one electric motor that drives one or more wheels on the vehicle. A child rider can control movement of the vehicle by stepping on or releasing a foot-pedal switch interposed between the battery and the motor. Many such vehicles also include a reversing switch to allow the vehicle to be driven in both directions.

Ride-on vehicles are subject to being driven on a variety of surfaces, including concrete, dirt and grass, as well as up and down hills. As a result, the power requirements for ride-on vehicles vary dramatically during operation. In particular, when driving level or downhill on hard surfaces, the motor draws relatively little current—2–5 amps. However, when traveling uphill or over rough surfaces like grass and dirt, substantially more current is required. Thus, the motor, switches, battery and wiring must be capable of handling very high currents.

Although a high-current battery is necessary for adequate vehicle performance, care must be taken when using such a battery to avoid short circuits or other malfunctions that would create current overloads. In particular, unless the battery is properly protected against short circuits, it is possible that a short in the vehicle wiring or motor could damage the vehicle. Accordingly, it is important that the battery and vehicle wiring be protected against short circuits.

In the past, the most common system for protecting against short circuits has been installation of a fuse in the battery or in the wires extending from the battery. The fuse is normally placed in or close to the battery to insure that an unprotected short does not occur in the wiring prior to the fuse. Any sustained current overload is interrupted by the operation of the fuse. However, if a user replaces a blown fuse by inserting aluminum foil, paper clips, or some other conductor into the fuse carrier rather than by obtaining and installing the correct fuse, the vehicle may become unprotected against shorts or overloads.

In order to prevent the user from bypassing the fuse, it is possible to substitute a circuit breaker for the fuse. A circuit breaker is a device that interrupts the flow of current in the event of an overload. In contrast to a fuse, which must be replaced after overload, a circuit breaker may be reset manually or, in some cases, resets automatically after cooling. In either case, the circuit breaker can be installed in the battery or in the wires leading from the battery. This eliminates the opportunity for the user to bypass the overload protection and thereby increases the safety of the vehicle.

Although using a circuit breaker instead of a fuse in the battery provided with the vehicle reduces the risk of damage from current overloads, user tampering still remains a problem. In addition, it is still possible that a user may purchase a replacement or extra battery for the vehicle which is not properly equipped with a circuit breaker. In particular, the sealed, lead-acid batteries that are normally used in ride-on vehicles come in various sizes and voltages. These batteries are also utilized in numerous other applications and are not always equipped with fuses or circuit breakers. If a user installs a battery that is not equipped with a fuse or circuit breaker, the vehicle may be left with no protection whatsoever against overload or short circuit. Moreover, even if the replacement battery is equipped with some type of overload protection, that protection may not be properly sized for the particular vehicle.

Accordingly, it is an object of the present invention to provide a child's ride-on vehicle which offers improved resistance to damage due to current overloads as a result of improper part replacement.

Another object of the present invention is to provide a connector assembly for a ride-on vehicle that prevents a user from installing a battery other than one specifically designed for the vehicle.

One more object of the present invention is to provide a connector assembly for a ride-on vehicle in which at least one contact on a vehicle side of the connector assembly is not electrically connected to the vehicle wiring system until mating with a corresponding portion of the connector assembly on a battery side.

Yet another object of the present invention is to provide a battery with a socket designed to cooperatively actuate a vehicle-mounted plug, whereby only a battery specifically designed for the vehicle may be used therein.

SUMMARY OF THE INVENTION

The present invention meets the above objectives by providing a battery connector system for use with a powered ride-on vehicle for children, where the vehicle includes an electric motor adapted to drive one or more wheels of the vehicle and a wiring harness configured to convey power to the motor. The battery connector system includes a plug attached to the wiring harness, the plug having a case substantially enclosing positive and negative plug contacts. The plug further includes a normally-open switch interposed between one of the plug contacts and the wiring harness. The switch has an actuator by which the switch may be closed, whereby the switched contact is not electrically connected to the wiring harness until the switch is closed. The system further includes a battery with positive and negative terminals, and a socket including housing structure adapted to fit together with the plug case. The housing structure substantially encloses positive and negative socket contacts which are respectively connected to positive and negative terminals of the battery. The housing structure is adapted to position the positive and negative socket contacts to respectively engage the positive and negative contacts on the plug when the housing structure and case are fit together. The battery connector also includes a key adapted to engage the actuator and close the switch when the socket and the plug are fit together.

BRIEF DESCRIPTION OF THE DRAWINGS OF THE PREFERRED EMBODIMENT

DETAILED DESCRIPTION

Figure 1:
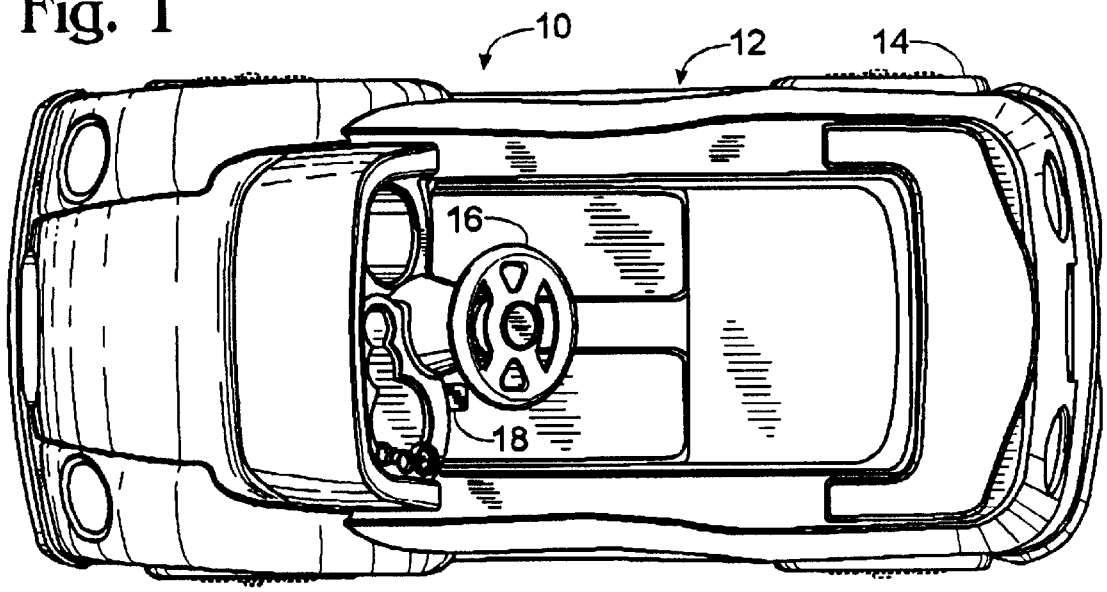
FIG. 1 is a top plan view of a vehicle according to the present invention.
Figure 2:
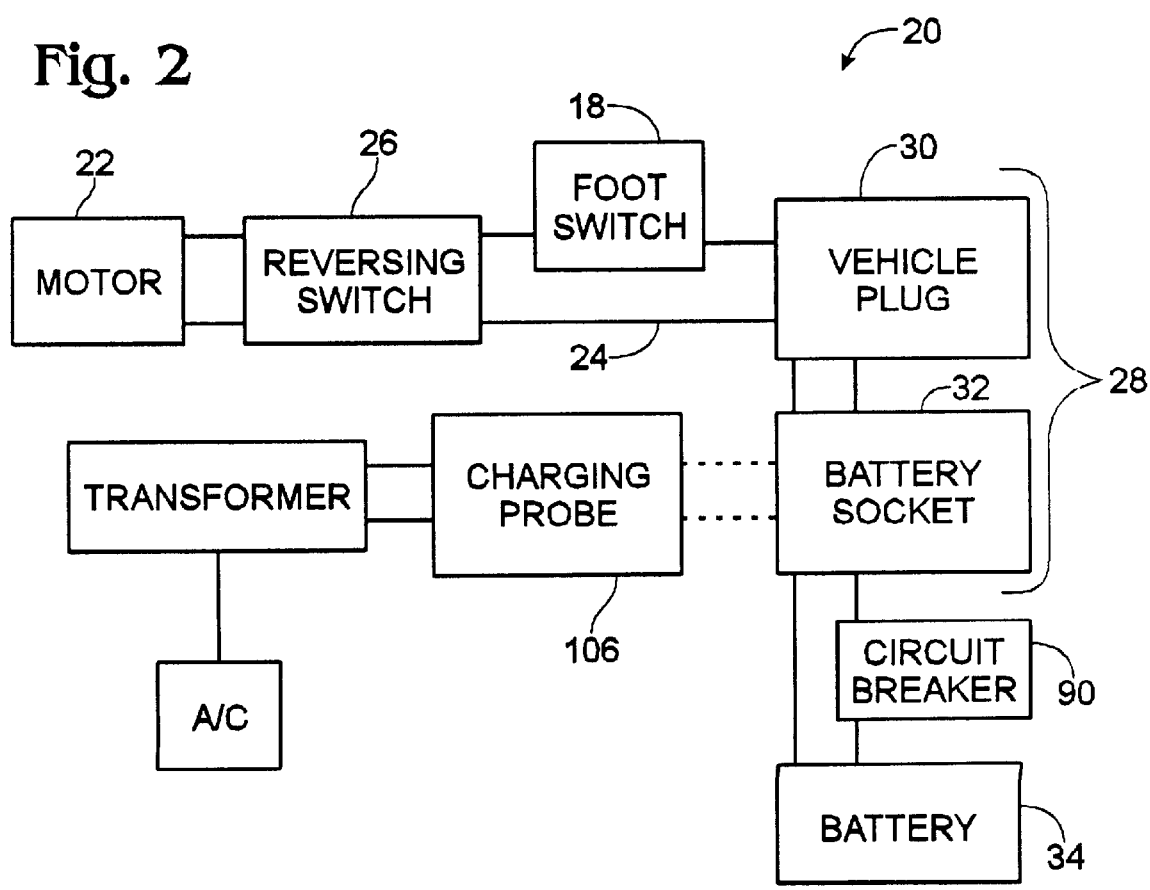
FIG. 2 is a schematic diagram of an electrical system of the vehicle of FIG. 1.

A ride-on vehicle according to the present invention is shown generally at 10 in FIG. 1. Vehicle 10 includes a body 12, wheels 14, a steering wheel 16 and a foot switch 18. As shown schematically in FIG. 2, foot switch 18 forms part of an electrical system 20 which powers the vehicle. Electrical system 20 includes a motor 22 connected by vehicle wiring or wiring harness 24 to foot switch 18. A reversing switch 26 is also disposed in vehicle wiring 24 to allow the direction of operation to be selected. The vehicle wiring extends from the switches to a connector assembly 28. The connector assembly includes a vehicle plug 30 which fits into a battery socket 32, which is preferably mounted to a battery 34, as will be described below.

Figure 3:
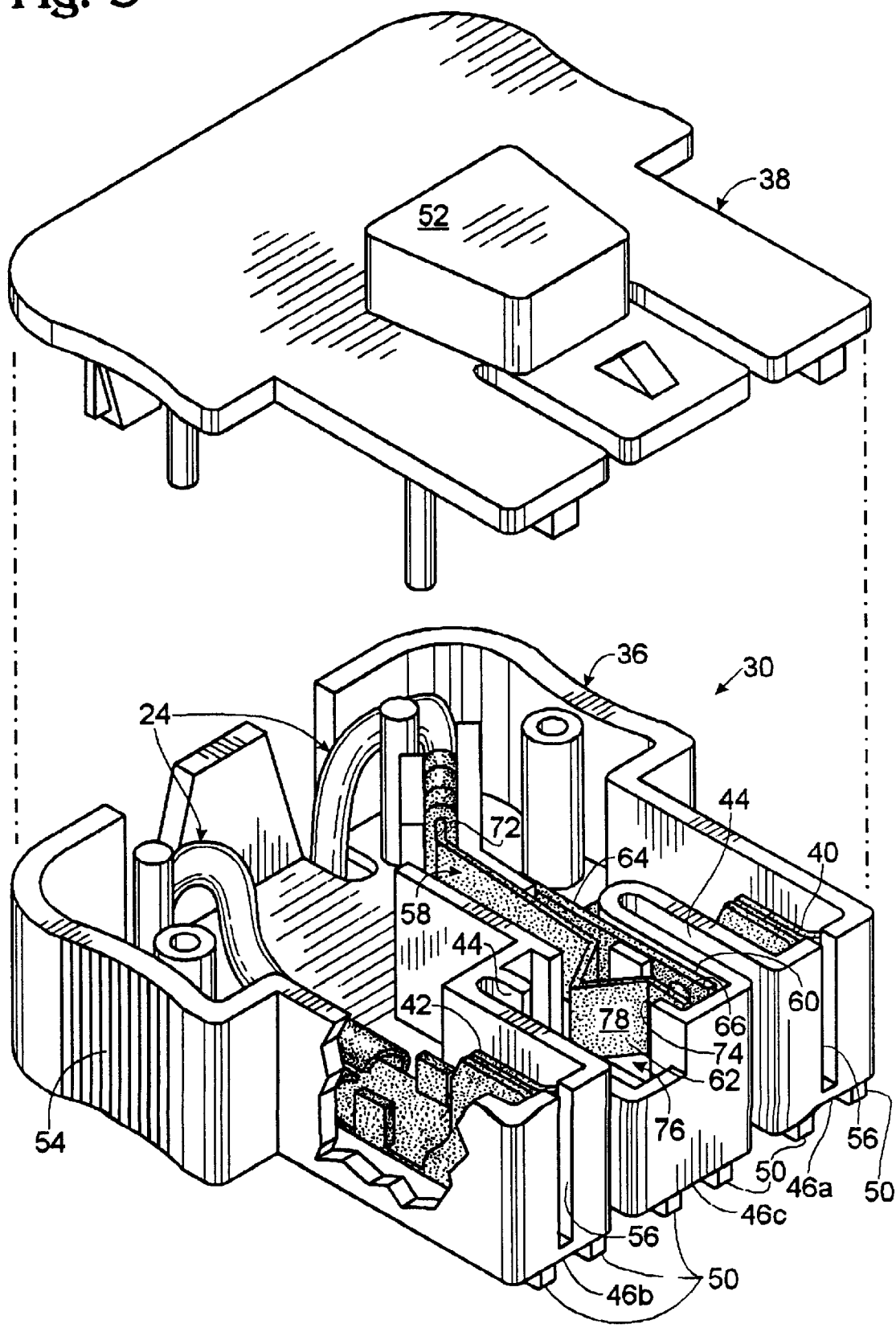
FIG. 3 is a perspective view of a vehicle-side plug according to the present invention.

As shown in FIG. 3, plug 30 includes a case 36 and a lid 38 which enclose positive and negative receivers in the form of blade receptacles 40, 42. Slots 44 are formed in the case adjacent each receptacle to divide the front of the plug into positive, negative and center prongs 46a–c. A pair of ribs 50 are formed on the lower surface of each prong to help reduce friction when installing the plug into the socket. An alignment member 52 is formed on the upper surface of the plug to visually aid the user in properly mating the plug with the socket. Grip portions 54 further aid the user when installing or removing the plug.

Prongs 46a, 46b each include a slot 56 to allow access to the respective receptacles contained therein. Negative receptacle 42 is connected directly to vehicle wiring 24. Positive receptacle 40, on the other hand, is connected to vehicle wiring 24 through a normnally-open switch 58. Thus, until switch 58 is activated, no power can flow from receptacle 40 to the vehicle.

Switch 58 includes a stationary contact 60, and a moveable contact 62. The stationary contact is formed together with positive receptacle 40 from a single metal strip 64. A contact button 66 is mounted on the end of strip 64 opposite receptacle 40. Moveable contact 62 is likewise formed from a single metal strip 68 and includes a contact button 70. A fixed end 72 of moveable contact 62 is mounted to case 36 and receives an end of the vehicle wiring. A flexing end 74 of moveable contact 62 extends toward a keyway 76 formed in center prong 48c of case 36. An actuator in the form of ramp bend 78 is formed in flexing end 74 adjacent button 70. The actuator is accessible through keyway 76.

Figure 4:
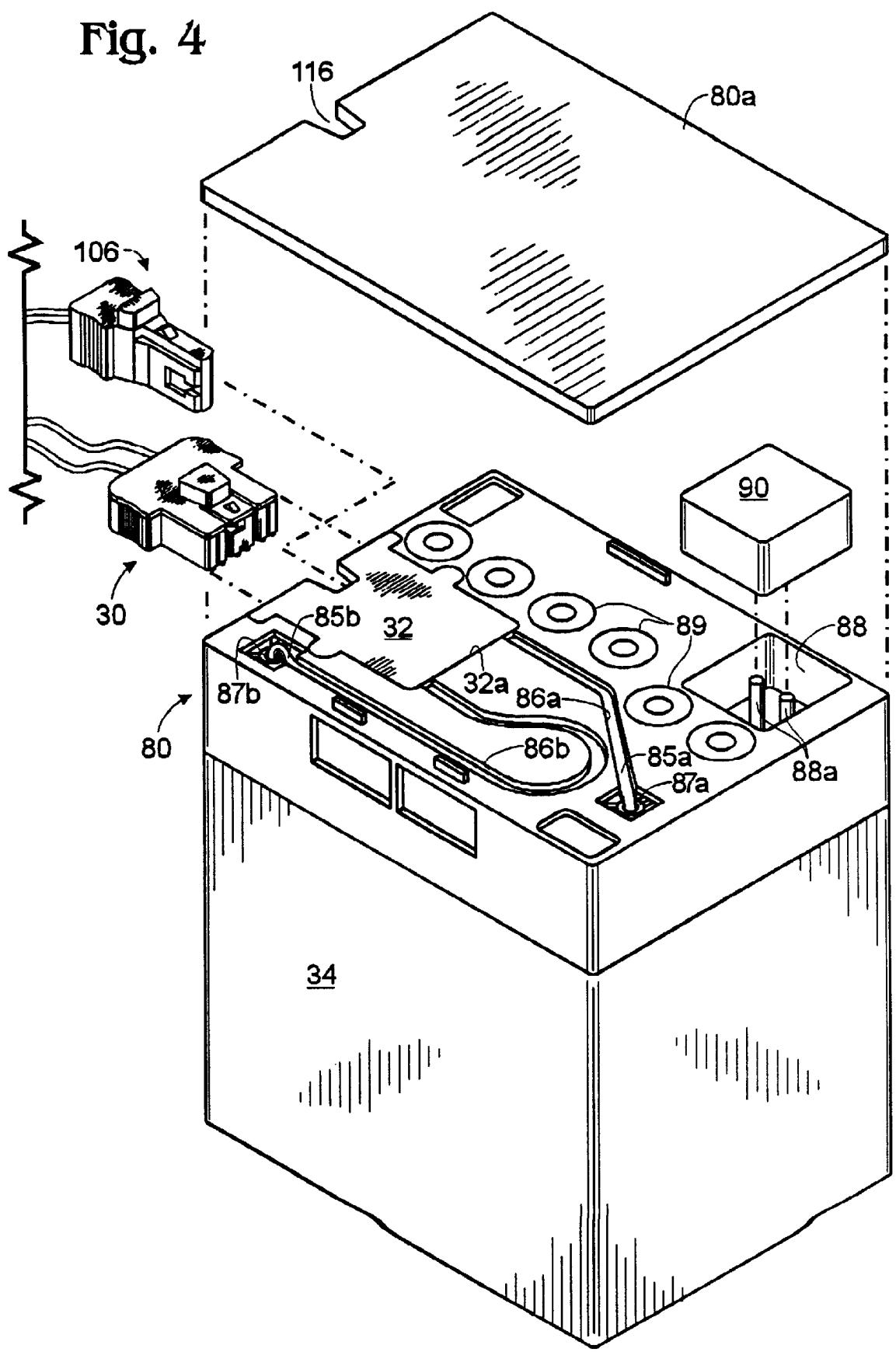
FIG. 4 is a perspective view of a battery assembly according to the present invention.
Figure 5:
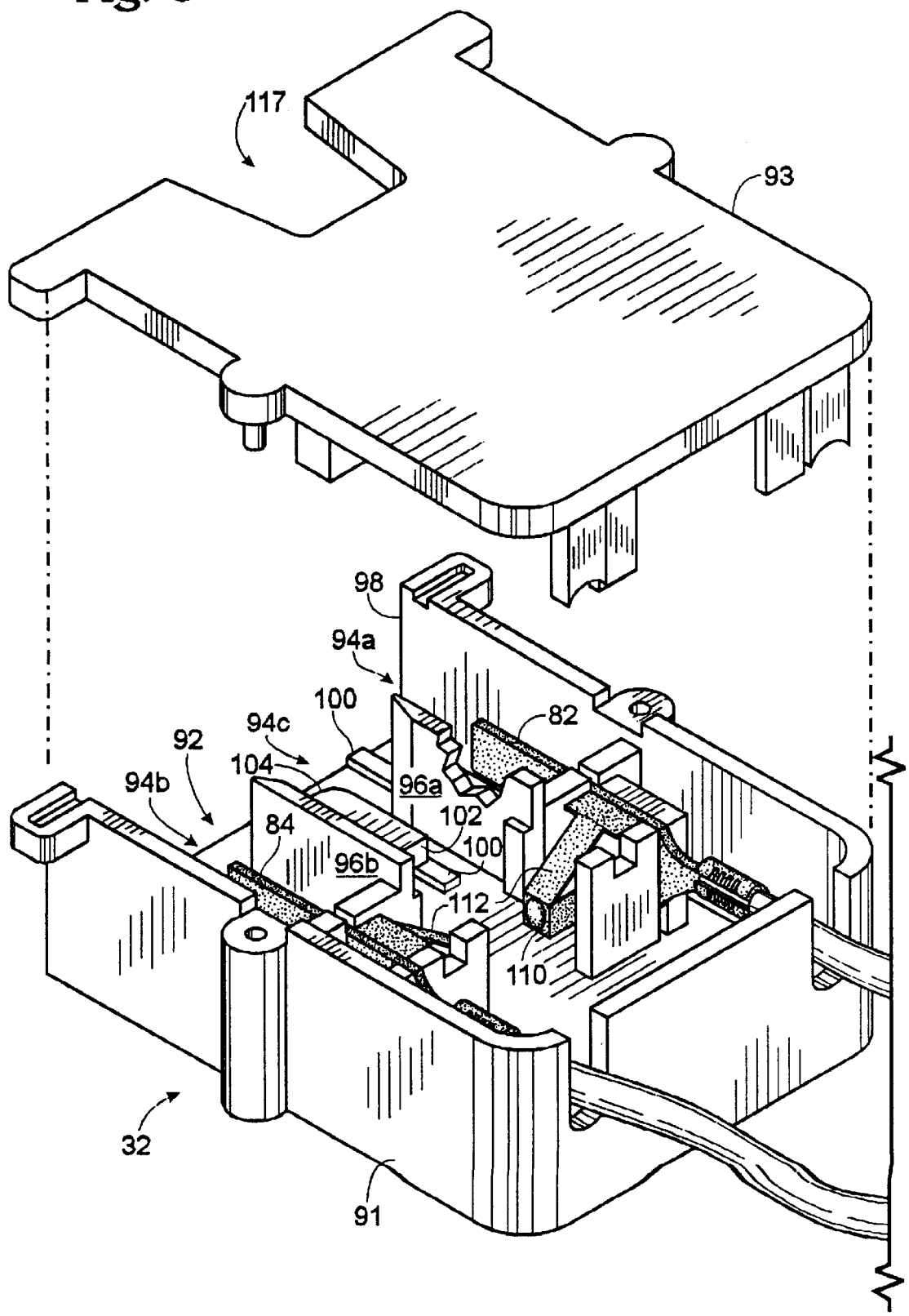
FIG. 5 is perspective view of a socket according to the present invention.

As shown in FIG. 4, battery socket 32 is disposed in a socket depression 32a on a battery top 80. Wires 85a, 85b run from socket 32 along wire routing channels 86a, 86b to positive and negative battery posts 87a, 87b. Battery top 80 also includes a circuit breaker depression 88 in which are disposed lead posts 88a. The lead posts are connected to adjacent cells 89 within the battery. Circuit breaker 90 fits in circuit breaker depression 88 and provides an electrical connection between lead posts 88a. Preferably, the circuit breaker is a thermal type that automatically resets after a current overload has stopped and the circuit breaker has cooled off. A cover 80a is placed over top 80 to protect the components placed in the battery top. A circuit breaker is preferred over a fuse because it eliminates the possibility that a user will replace a fuse with something other than a properly sized fuse. Moreover, because the circuit breaker is located under cover 80a, it is less subject to user tampering.

Socket 32 includes housing 91 and lid 93 defining a plug-receiving pocket 92, which is divided into positive, negative and center pockets 94a–c by positive and negative baffles or partitions 96a, 96b. The partitions serve to prevent the blade lugs from shorting against some object that may be inserted into pocket 92. In particular, the partitions and front edge 98 of housing 91 project forward further than the blade lugs so that no straight or flat object, such as a nail or a paper clip, may simultaneously touch both blades. Thus, the housing may be seen to substantially enclose or surround the lugs to thereby reduce the chance of an accidental short circuit.

Ribs 100 are formed on the upper and lower inside surfaces of the positive and negative pockets and on the lower inside surface of the center pocket. As mentioned above, the ribs, together with ribs 50, help to reduce the insertion force as the plug and socket are mated.

Center pocket 94c includes a key structure 102 projecting off of partition 96b proximal to the upper inside surface of the pocket. Key 102 includes a rounded front corner 104 which is adapted to slide into keyway 76 and engage ramp bend or actuator 78 to close switch 58 as the plug is inserted into the socket. The key is positioned to close the switch only when the plug and socket are substantially fully engaged.

Figure 6:
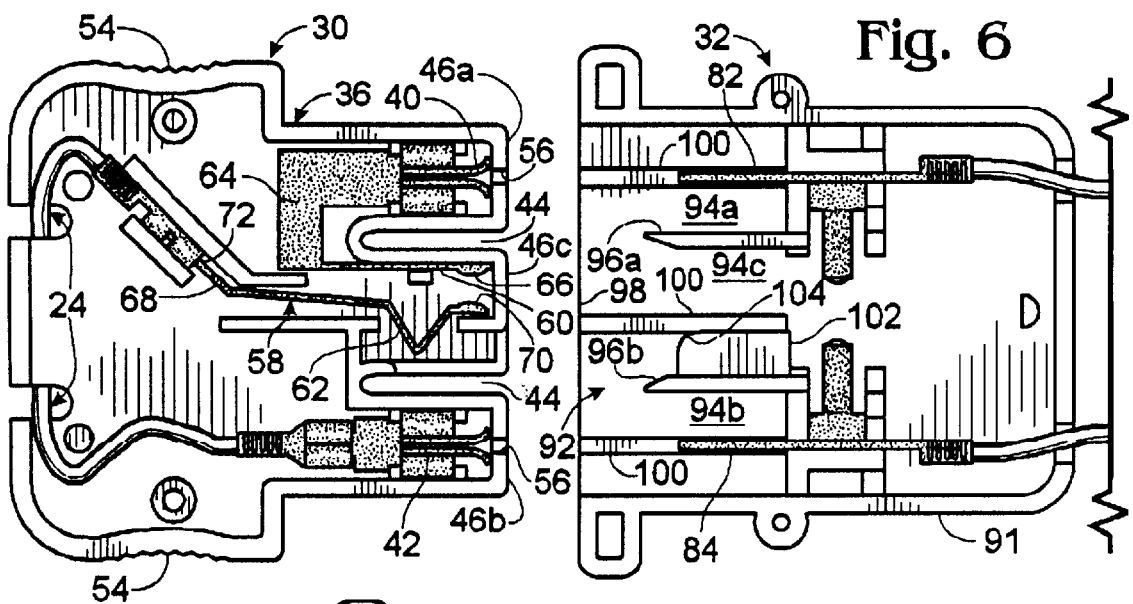
FIGS. 6–8 illustrate the operation of the plug and socket according to the present invention.
Figure 7:
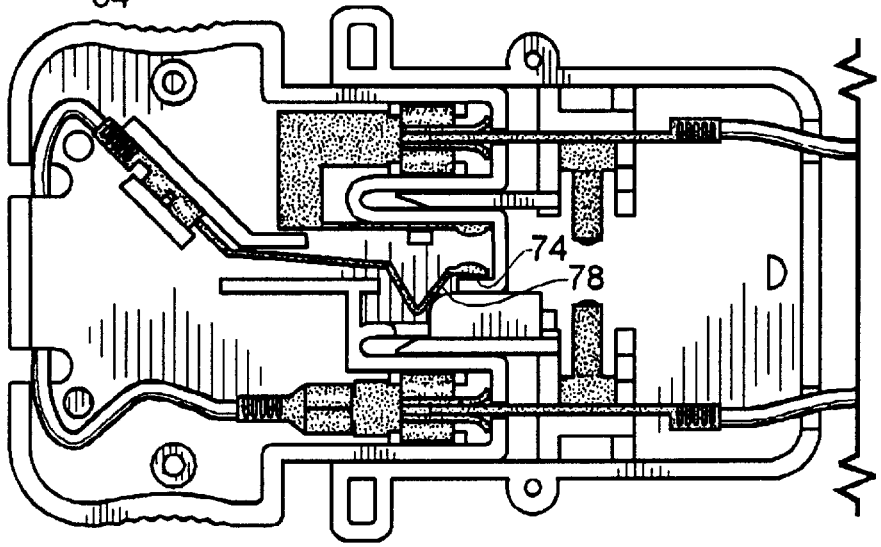
Figure 8:
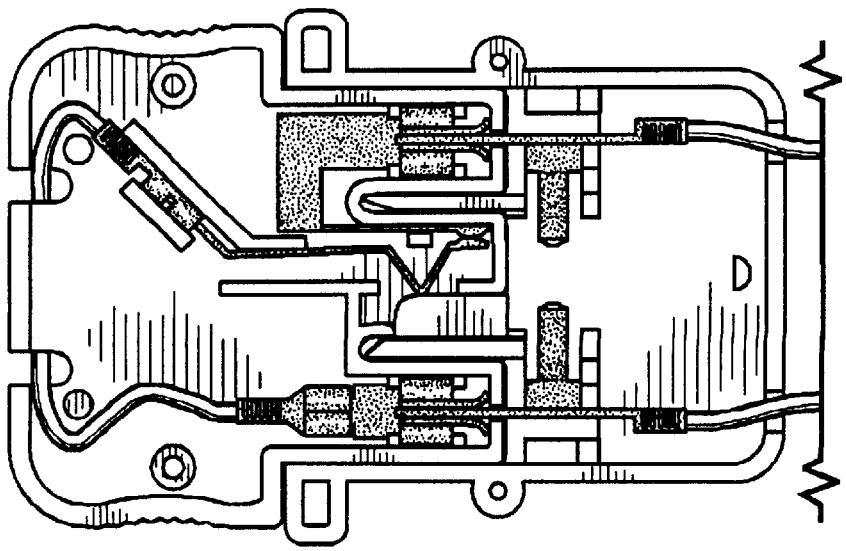

FIGS. 6–8 illustrate the operation of the key and switch as the plug and socket are engaged. In particular, the plug and socket are shown disconnected in FIG. 6. FIG. 7 shows the plug and socket partially engaged, where the key just begins to move the actuator. Lastly, FIG. 8 shows the fully mated position where the switch is closed by the key and both blade lugs are engaged in the corresponding receptacles.

Figure 9:
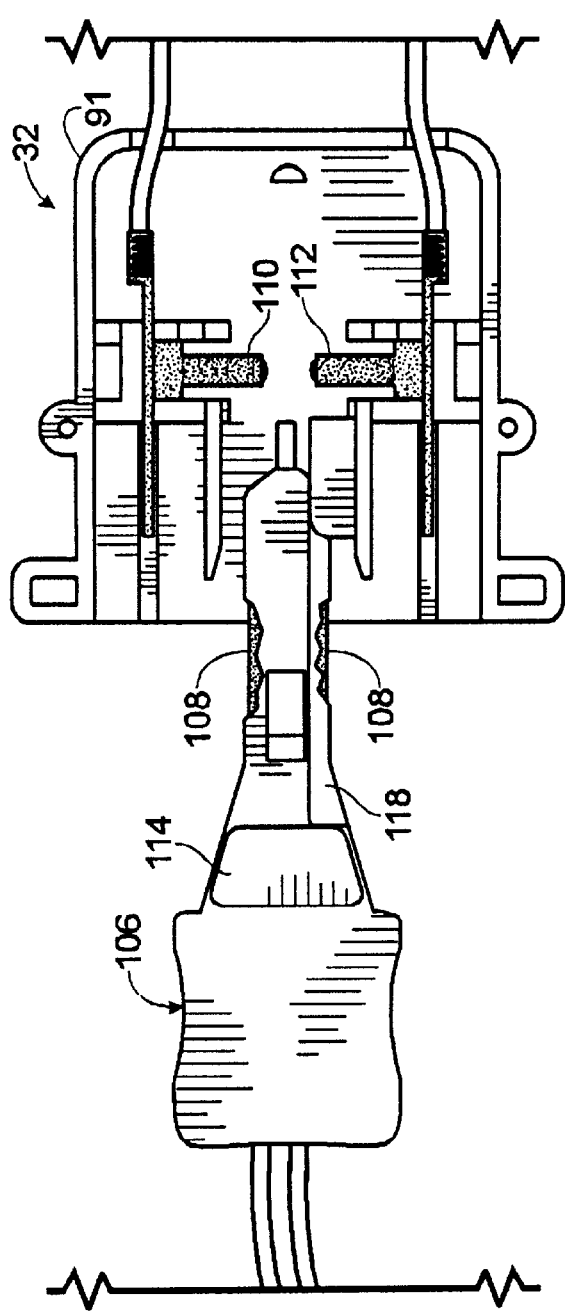
FIGS. 9–10 illustrate the operation of a charging probe and jack according to the present invention.
Figure 10:
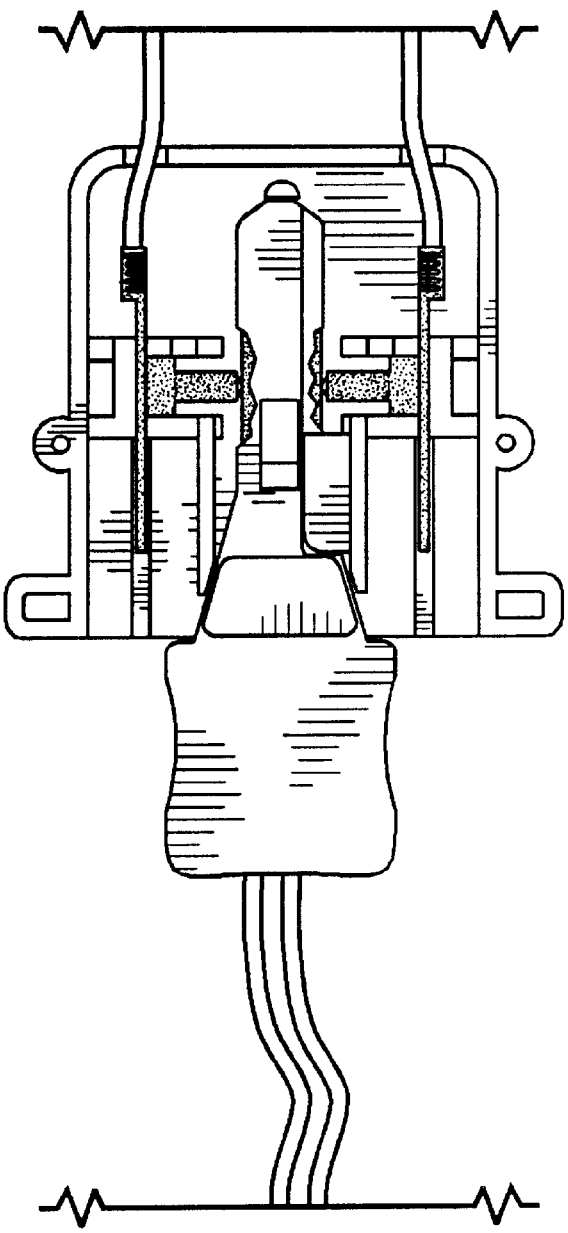

Center pocket 94c also serves as a charging jack for the battery. In particular, as shown in FIGS. 9–10, center pocket 94c is configured to receive a charging probe 106. The charging probe has contact plates 108 on either side which are engaged by positive and negative contact arms 110, 112. The contact arms are electrically connected to their corresponding blade lugs 82, 84. Like vehicle plug 30, charging probe 106 includes an alignment member 114 to aid the user in establishing the correct plug orientation. Both alignment members are adapted to be received in alignment notches 116, 117 formed in cover 80a, and lid 93, respectively. The probe has a notch 118 which receives key 102 as the probe is inserted to ensure proper polarization.

It should be noted that the key, because of its asymmetrical position, also ensures proper polarization for connector assembly 28. If a user attempts to insert plug 30 into battery socket 32 so that positive and negative blade receptacles 40, 42 are respectively aligned with negative and positive blade lugs 84, 82, the front face of key 102 will impact the front of center prong 46c before the blade receptacles contact the to blade lugs. Because both the key and the center prong have relatively blunt surfaces at their respective points of contact, they will resist considerable force without bending or breaking when the user attempts to incorrectly mate the plug and socket. Thus, the plug and socket cannot be inadvertently forced together the wrong way.

Figure 11:
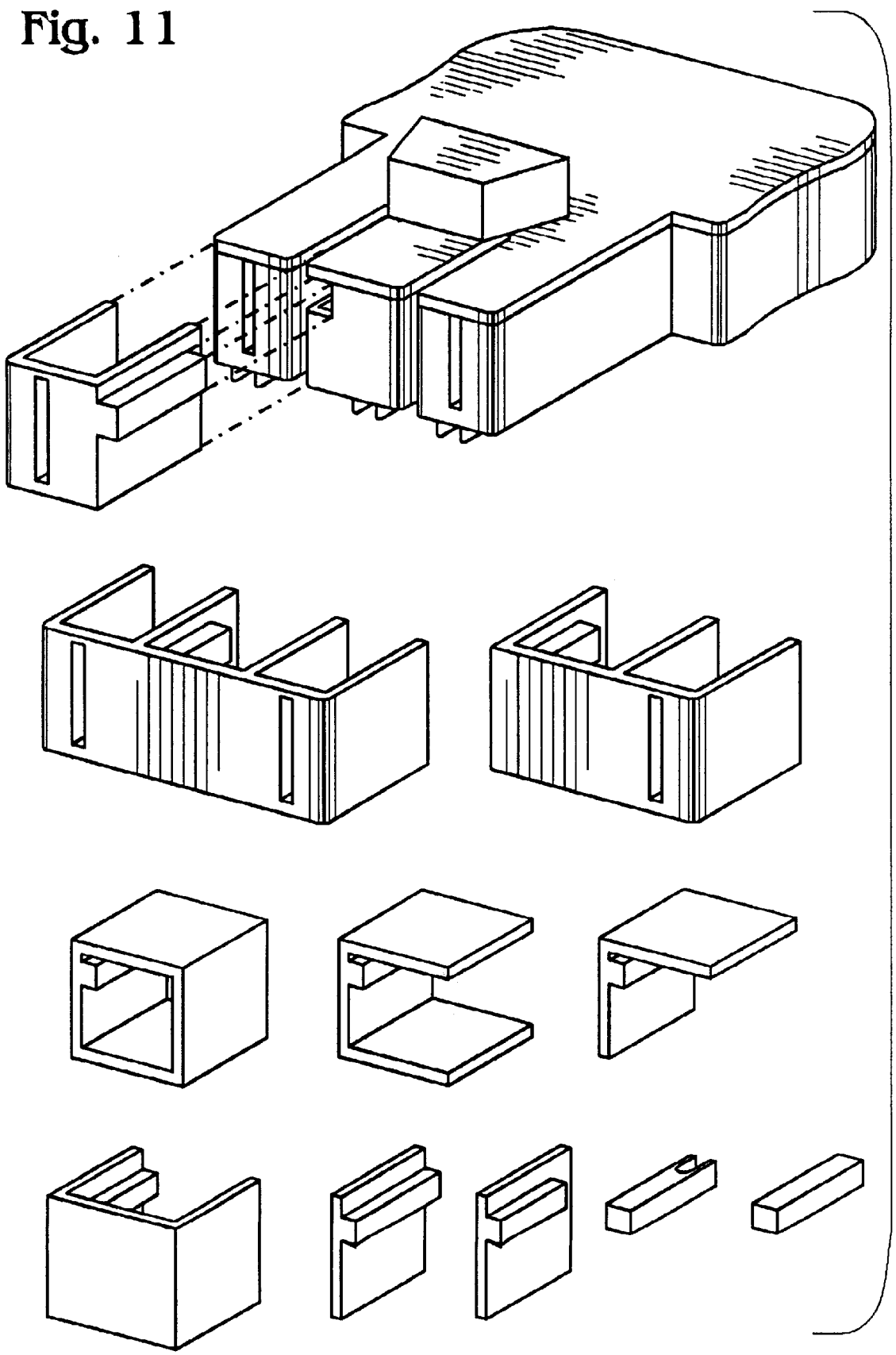
FIG. 11 illustrates various key designs according to the present invention.

Although it is preferred to form the battery socket as a unitary member retained in a cover on the battery, FIG. 11 illustrates a number of structures that could be used in place of key 102 in a multi-piece socket to operate vehicle plug 30. In such a case, the blade lugs may be mounted in a separate case or cases. Use of a separate key has the disadvantage, however, of increasing the chance the user will improperly reverse the connectors and/or use an incorrectly configured battery.

While the present invention has been shown and described with reference to the foregoing preferred embodiment, it will be apparent to those skilled in the art that other changes in form and detail may be made therein without departing from the spirit and scope of the invention as defined in the appended claims.

We claim:

1. A battery connector system for use with a powered ride-on vehicle for children, the vehicle including an electric motor adapted to drive one or more wheels of the vehicle and a wiring harness adapted to convey power to the motor, the battery connector system comprising:

a plug attached to the wiring harness and including a case substantially enclosing positive and negative contacts, the plug further including a normally-open switch interposed between a switched one of the contacts and the wiring harness, the switch having an actuator by which the switch may be closed, whereby the switched contact is not electrically connected to the wiring harness until the switch is closed;

a battery including positive and negative terminals; and a socket including housing structure adapted to fit together with the case and substantially enclosing positive and negative contacts connected to positive and negative terminals of the battery, respectively, the housing structure being adapted to position the contacts to engage the positive and negative contacts on the plug when the housing structure and case are fit together, the socket further including a key adapted to engage the actuator and close the switch when the housing structure and case are fit together.

2. The system of claim 1, wherein the socket housing structure further includes a partition disposed between the positive and negative contacts to prevent accidental shorting therebetween.

3. The system of claim 2, wherein the socket includes a plug-receiving pocket, and the partition divides the pocket into separate portions.

4. The system of claim 3, wherein the key structure is formed on the partition.

5. The system of claim 1, wherein the socket further includes a charging jack adapted to receive a charging probe.

6. The system of claim 5, wherein the charging jack further includes positive and negative contact arms connected to the positive and negative terminals of the battery, respectively, and adapted to engage corresponding contact plates formed on the charging probe to convey power from the probe to the battery.

7. The system of claim 1, wherein the battery has a plurality of cells, the system fuirther including a circuit breaker disposed between two of the plurality of cells.

8. The system of claim 1, wherein the battery includes a cover and the socket is mounted to the battery under the cover.

9. The system of claim 1, wherein the key prevents the plug from being inserted into the socket with incorrect polarization.

10. The system of claim 1, wherein the key is positioned to actuate the switch only when the plug is substantially fully engaged in the socket.

11. The system of claim 1, wherein the socket housing structure is a single piece which positions both contacts and the key to receive the plug.

12. A battery system for use in a powered ride-on vehicle for children, the vehicle having a wiring system with a plug including a case enclosing spaced-apart positive and negative blade receptacles and a normally open switch disposed between one of the receptacles and the wiring system to connect the receptacle with the wiring system upon actuation of the switch, the switch having an actuator located between the blade receptacles with the case having a keyway allowing access to the actuator, the battery system comprising:

a battery with positive and negative terminals;

positive and negative electrical leads connected to the positive and negative terminals of the battery, respectively, to deliver power therefrom, each lead including a blade lug at an end of the lead opposite the battery, the lugs being adapted to fit into corresponding ones of the positive and negative receptacles;

a key adapted to be positioned between the blade lugs to project into the keyway in the plug case and adapted to actuate the switch when projecting into the keyway; and housing structure surrounding the blade contacts sufficiently to prevent the blade contacts both from inadvertently contacting each other and from simultaneously being contacted by a straight surface, the housing structure further including at least one opening configured to receive a portion of the plug case whereby the blade lugs can engage the blade receptacles.

13. The system of claim 12, wherein the housing structure includes a partition disposed between the blade contacts.

14. The system of claim 13, wherein the key is mounted to the housing structure.

15. The system of claim 14, wherein the key is mounted to the partition.

16. The system of claim 12, wherein the battery system further includes a charging jack disposed within the housing structure, the charging jack including positive and negative contact arms connected to the positive and negative blade contacts, respectively, and adapted to engage contact plates formed on a charging probe.

17. The system of claim 12, wherein the housing structure is disposed within a cover attached to the top of the battery.

18. The system of claim 17, wherein the cover includes an alignment notch adapted to receive an alignment member formed on the plug case to thereby provide a user with a visual indication of proper plug orientation.

19. A battery connector system for a powered ride-on vehicle for children with the vehicle having an electrical system, the battery connector system comprising:

a plug on the vehicle, wherein the plug includes a case holding a pair of laterally spaced receivers and a normally-open switch having an actuator, the case further having a keyway located between the receivers and permitting access to the actuator, the receivers being electrically connected to the vehicle electrical system with one of the receivers being connected through the switch, whereby the switch establishes communication between the other receiver and the vehicle electrical system when the switch is closed;

a battery with positive and negative terminals;

a pair of contacts, wherein each contact is coupled to a respective one of the terminals and is configured to engage a respective one of the receivers to establish communication between the battery and the vehicle electrical system; and a housing structure at least partially enclosing the contacts so that the contacts can be positioned in a laterally spaced relationship to engage the receivers, wherein the housing structure includes a partition positioned between the contacts and a key shaped to be received within the keyway to close the switch when the receivers and contacts engage each other, thereby establishing communication between the battery and the vehicle electrical system.

20. The system of claim 19, wherein the housing structure includes a pair of laterally spaced partitions extending between the contacts to define a pocket extending generally parallel to the contacts, with the key extending within the pocket.

21. The system of claim 20, further including a charging jack disposed within the pocket.

22. The system of claim 19, wherein the housing structure includes a pocket adapted to receive a portion of the plug, and the pocket includes a plurality of laterally spaced and longitudinally extending ribs that guide and reduce the friction between the plug and the pocket as the plug is received in the pocket.

23. The system of claim 19, wherein the key prevents the receivers from being engaged with the contacts with incorrect polarization.

* * * * *